Oct. 24, 1944.    F. LEOPOLD    2,360,836
CONVEYING APPARATUS
Filed Nov. 12, 1941    5 Sheets-Sheet 3
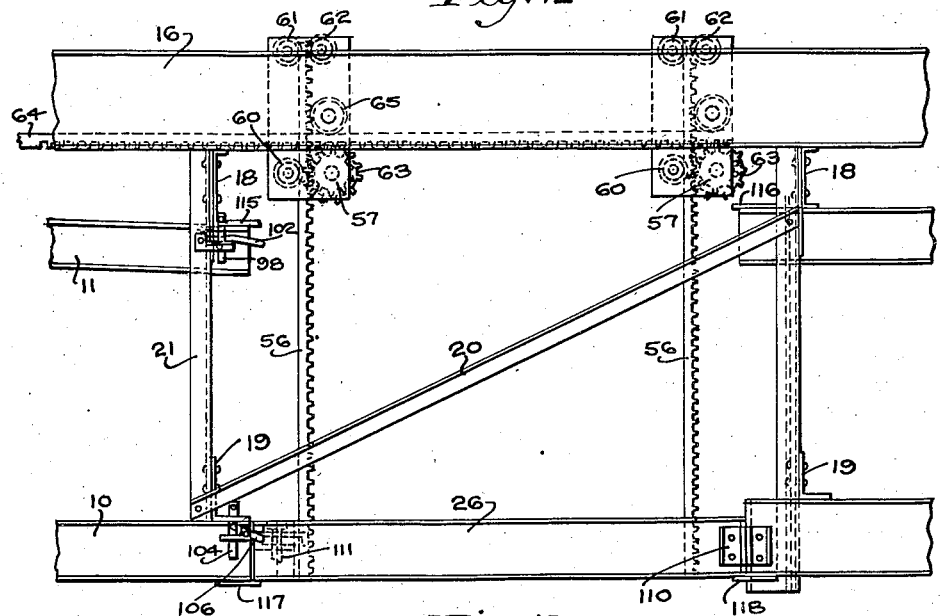
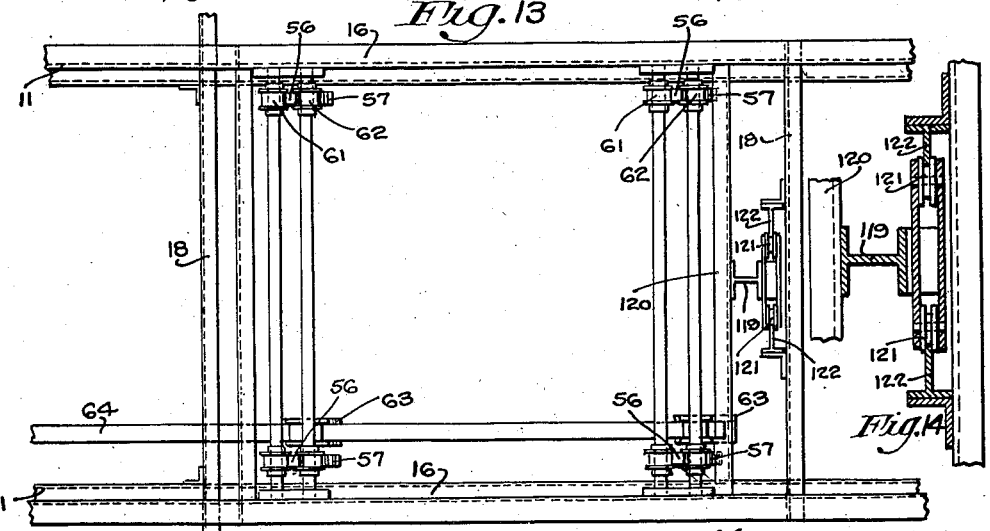
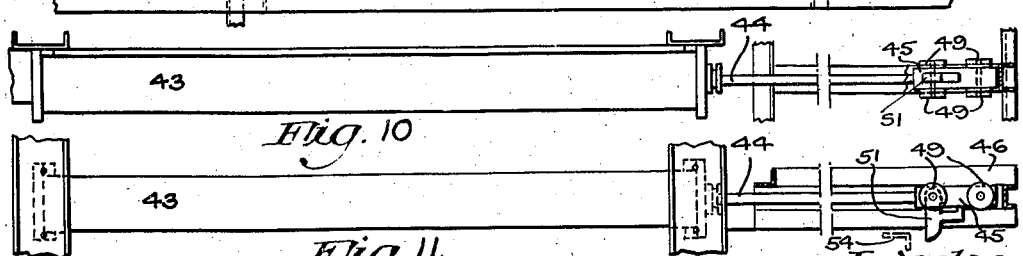
Inventor:
FREDERICK LEOPOLD
By ...
Attorney.

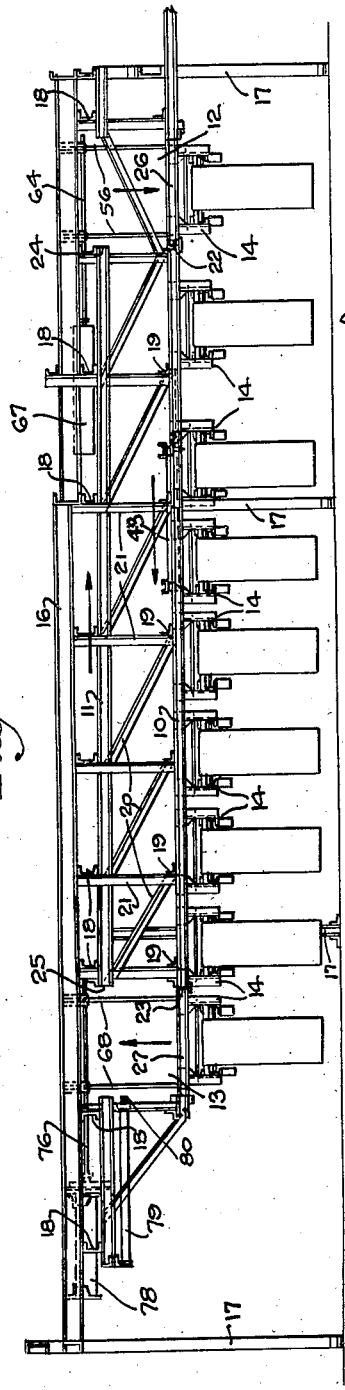

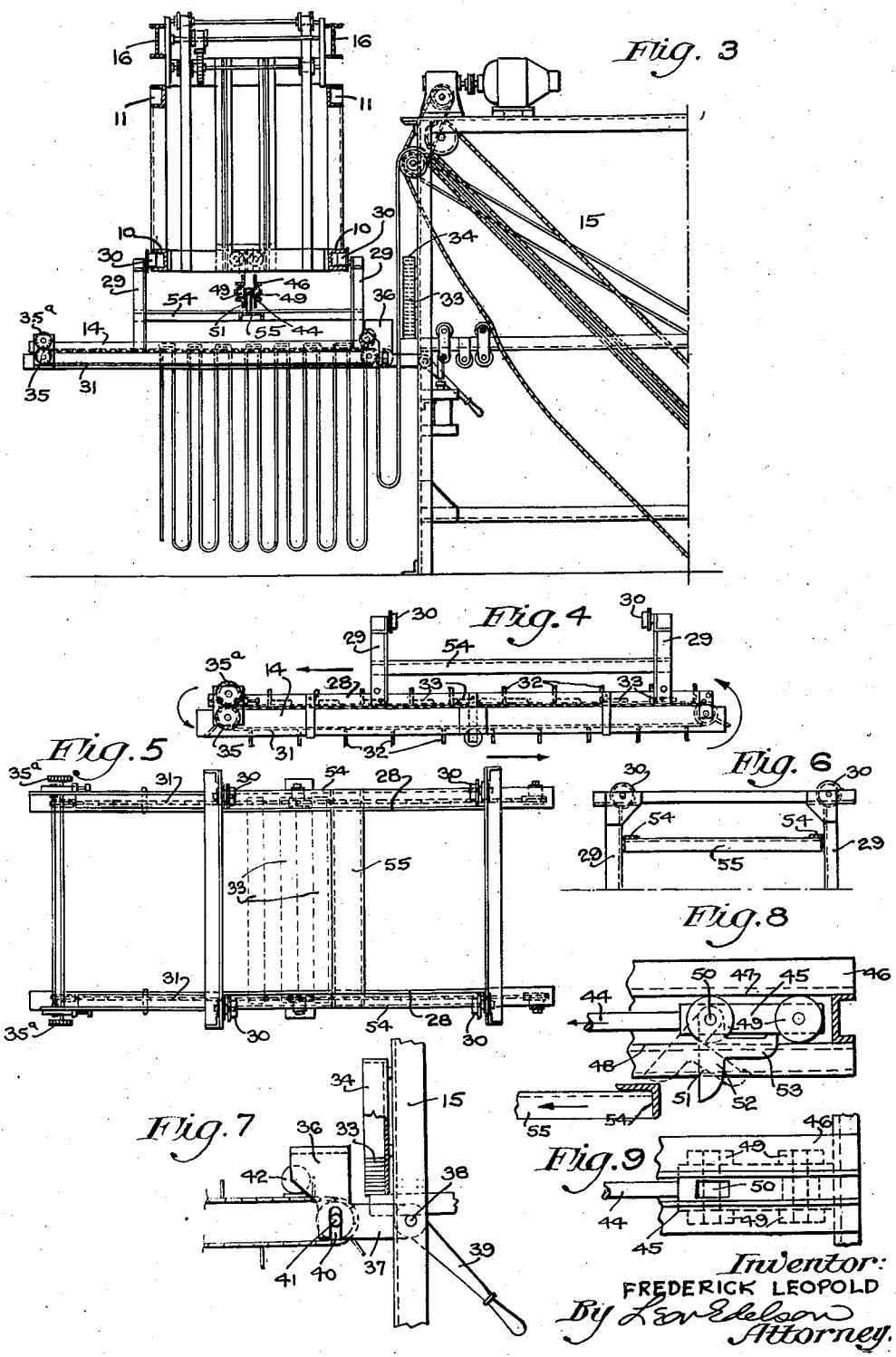

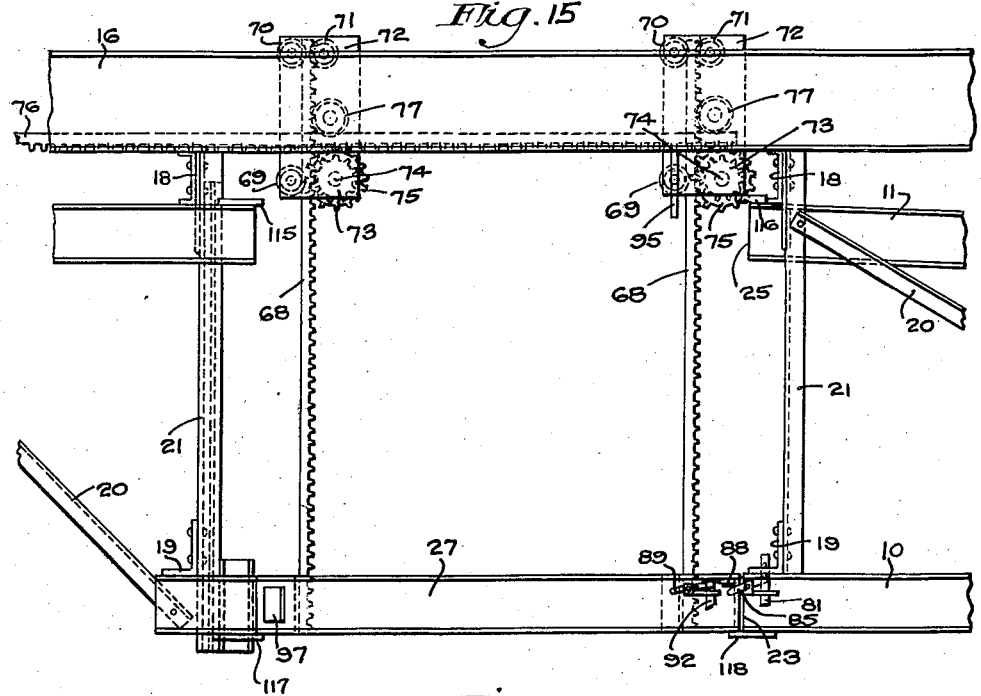
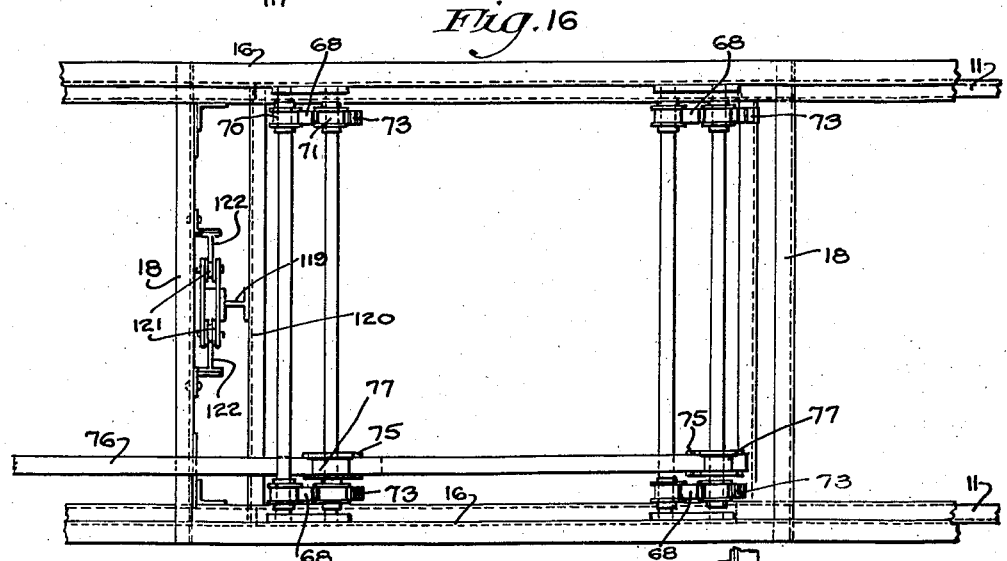
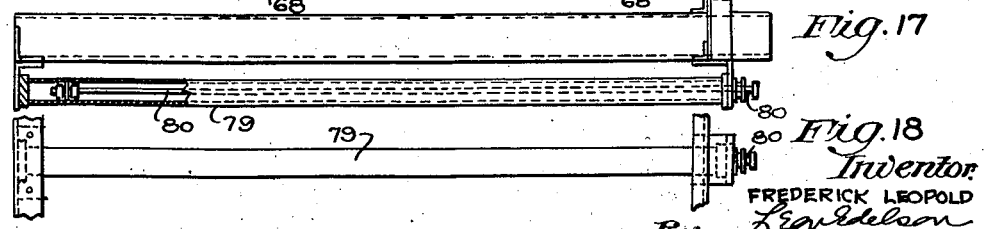

Oct. 24, 1944.  F. LEOPOLD  2,360,836
CONVEYING APPARATUS
Filed Nov. 12, 1941  5 Sheets-Sheet 5
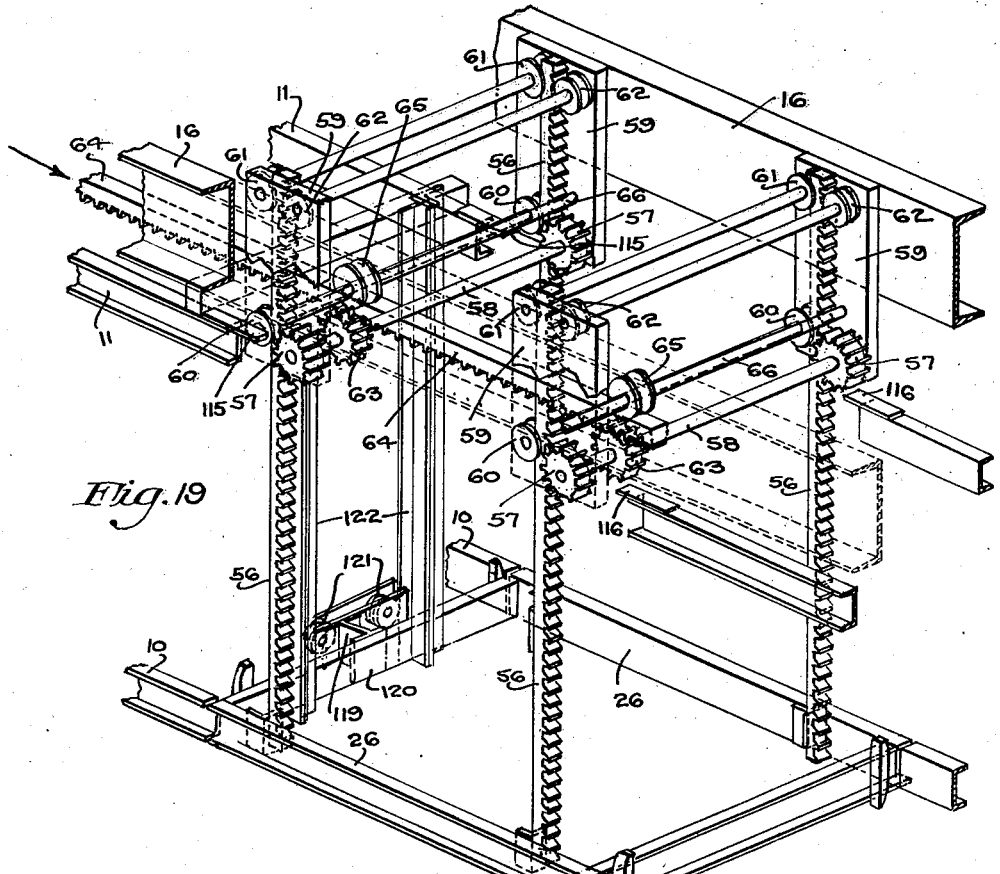
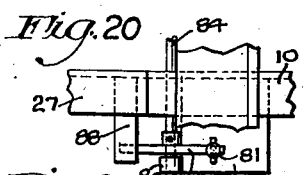
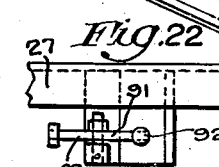
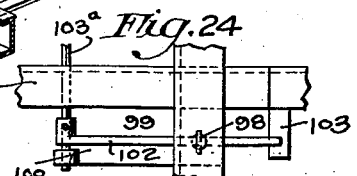
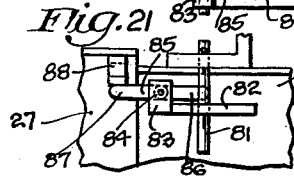
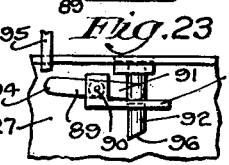
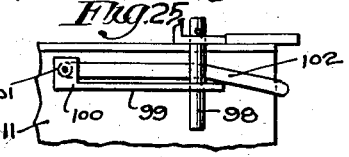
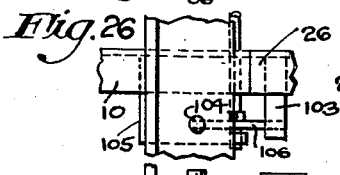
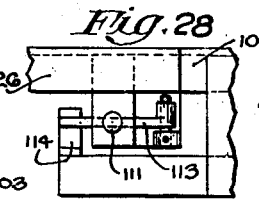
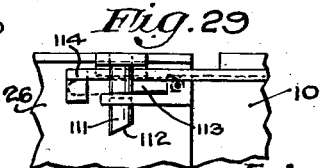
Inventor
FREDERICK LEOPOLD
By Leon Edelson
Attorney Patented Oct. 24, 1944

2,360,836

UNITED STATES PATENT OFFICE 2,360,836

CONVEYING APPARATUS

Frederick Leopold, Harmonville, Pa., assignor to Lee Rubber & Tire Corporation, Conshohocken, Pa., a corporation of New York Application November 12, 1941, Serial No. 418,654

4 Claims. (Cl. 104—89)

This invention relates generally to material handling apparatus and more particularly to an improved apparatus for handling slabs of rubber and the like which are removed from a continuously operating mixing or sheeting mill, it being among the principal objects of the present invention to provide a conveyor mechanism which is especially adapted for use in conjunction with an automatic stock take-off apparatus of the character shown and described in United States Letters Patent No. 2,102,453, issued December 14, 1937.

In this previously patented apparatus means are provided for automatically stripping the rubber stock from the revolving surface of the forward roll of the mill in the form of a continuous strip and then conveying the stock through a coating bath and to a carriage from which it is suspended in the form of a festooned strip. When the carriage of the patented apparatus is fully loaded with the festooned stock it is shifted laterally to one side of its loading station to permit a second carriage to be moved into the loading position. While said Letters Patent No. 2,102,453 describe the carriages as being shiftable along an overhead track for conveyance to a remote point for subsequent operations upon or handling of the festooned stock, the shifting of the carriages along the track is performed manually and no special provision is made for returning the unloaded carriages to the loading station.

In order to speed up the handling of the stock as it is loaded upon the carriage and thereby realize to fullest advantage the increased production capacity of the mixing or sheeting mill as made possible by the apparatus of said Letters Patent No. 2,102,453, the present invention has as its main object the provision of a conveyor system which is mechanically operative to shift the loaded carriages successively from the loading station to a remote unloading station and then return the unloaded carriages successively from the unloading station to a point in advance of the loading station from whence they may be shifted into loading position as required.

The conveyer system of the present invention is characterized in that it provides a fixed orbit of movement of the carriages both loaded and unloaded, the arrangement being such that as each carriage is loaded it is initially impelled along its path of movement to an extent sufficient to remove it entirely from the loading station and present it in engagement with a previously loaded carriage, in consequence of which the entire line of loaded carriages is intermittently shifted toward the loading station. When the first loaded carriage in the line reaches the loading station, the operator removes the stock from the carriage by preliminarily slitting each looped section of the festooned stock in such manner as to leave suspended upon the carriage a plurality of doubled sections of stock which are then each readily removable from the carriage. The unloaded carriage is then elevated to a point in the conveyor orbit where it is given an initial impulse sufficient to effect its return by gravity toward the loading station.

The capacity of the conveyor system is such that enough loaded carriages may be accommodated between the loading and unloading stations to render possible continuous operation of the stock sheeting mill, it being possible by means of the present invention to so time the operation of unloading the festooned stock from a supporting carriage at the unloading station that it substantially coincides with the operation of loading a carriage at the loading station.

The present invention is of great advantage not only because it eliminates the labor and time heretofore required in manually handling the unloaded conveyors, but also because it saves a great deal of floor space and yet provides such ample distance of travel of the stock away from the loading station that the time consumed in such travel is enough to permit the stock to cool sufficiently for handling at the unloading station.

Also, the speed with which the stock is removed from the stock take-off apparatus by virtue of the conveyor system of the present invention renders it economically possible to provide for increased speed and capacity of production of the sheeted stock for delivery to the stock take-off apparatus of the character described in said Letters Patent No. 2,102,453 aforesaid. Thus, in place of the mixing mill therein described which "kneads" the rubber compound and forms it into sheet form, a Banbury mixer may be employed in conjunction with a sheeting mill with resultant greatly increased speed of production of the sheet rubber which is delivered to the stock take-off apparatus. The present conveyor system makes possible the removal of the loaded carriages from the loading position and their replacement with unloaded carriages at such rapid pace as not to require any such interruption in the operation of the Banbury mixer as would be necessary with manual handling of the carriages for receiving the festooned stock.

Other objects of the invention and advantages resulting from the operation of a conveyor system constructed in accordance with and embodying the principles thereof will appear more fully hereinafter.

The invention consists substantially in the combination, construction, location and relative arrangement of parts, all as will appear more fully hereinafter, as shown in the accompanying drawings, and as finally pointed out in the appended claims.

In the accompanying drawings, which illustrate and exemplify certain preferred embodiments of the present invention—

Figure 1 is a side elevational view of the conveyor system constructed in accordance with and embodying the principles of the present invention;

Figure 2 is a top plan view of the system shown in Figure 1, this view showing in addition a portion of the stock take-off apparatus in operatively associated relation to the conveyor system;

Figure 3 is a transverse sectional view taken on the line 3—3 of Figure 2;

Figure 4 is an end elevational view of one of the movable carriages upon which the stock is adapted to be supported in festooned condition;

Figure 5 is a top plan view of the carriage;

Figure 6 is a side elevational view thereof;

Figure 7 is a detail view of the interlocking device between the stock take-off apparatus and the carriage which is operative to prevent movement of the latter during the operation of loading the same;

Figures 8 and 9 are side and top views, respectively, of a part of the pusher mechanism for shifting the loaded carriage out of loading position;

Figures 10 and 11 are side and top views, respectively, of the pusher mechanism shown partly in Figures 8 and 9;

Figures 12 and 13 are side elevational and top plan views, respectively, of the conveyor mechanism for lowering the unloaded carriages into loading position;

Figure 14 is an enlarged transverse sectional view of the right-hand end portion of Figure 13;

Figures 15 and 16 are side elevational and top plan views, respectively, of the conveyor mechanism for raising the carriages, when unloaded, into position for gravity return to the loading station;

Figures 17 and 18 are side and top views, respectively, of the pusher mechanism for initiating the return movement of the unloaded carriages;

Figure 19 is a perspective view of the lowering mechanism as shown in Figures 12 and 13; and Figures 20 to 29, inclusive, are detail views of the various safety latches employed in conjunction with the raising and lowering mechanism of the conveyor system.

Referring now to the drawings and more particularly to Figures 1, 2 and 3 thereof, which show in general the construction of the conveyor system of the present invention and its relation to the stock take-off apparatus hereinbefore referred to, it will be observed that this conveyor system essentially includes a lower pair of laterally spaced tracks 10—10 disposed in a substantially horizontal plane and extending between the loading station A and the unloading station B; an upper pair of laterally spaced tracks 11—11 disposed above the first pair of tracks and also extending between the loading station A and the unloading station B, this upper pair of tracks being inclined downwardly from the unloading station toward the loading station; a pair of substantially similar elevating mechanisms designated generally by the reference numerals 12 and 13, respectively, and disposed respectively at the loading and unloading ends of the stationary conveyor tracks 10—10 and 11—11; and a plurality of carriages designated generally by the reference numeral 14 for receiving the stock delivered from the take-off apparatus at the loading station A and conveying it along the tracks 10—10 toward and to the unloading station B. The stock take-off apparatus is designated generally by the reference numeral 15 and is of the construction shown and described in detail in the aforesaid United States Letters Patent No. 2,102,453, issued December 14, 1937. Although the conveyor system of the present invention is herein shown and illustrated in operative association with the stock take-off apparatus of said patent, it will be understood, of course, that this conveyor system is not necessarily limited to use with the particular take-off apparatus shown, but instead may be employed to equal advantage in connection with other types of stock take-off apparatus.

As appears quite clearly in Figures 1, 2 and 3, the stationary tracks 10—10 and 11—11 of the conveyor system and the elevator mechanisms 12 and 13 are supported in operative relation by means of any suitable framework, as for example, a framework composed of a pair of longitudinally extending main beams 16—16 supported above the floor at a suitable elevation by means of the uprights 17, these main beams 16—16 in turn supporting an auxiliary framework of generally rectangular form in horizontal plan and consisting of a pair of longitudinally extending members 17a—17a which are interconnected by a plurality of transversely extending members 18—18, these latter members being suitably secured to the undersides of the main beams 16—16 and in turn supporting the upper pair of conveyor tracks 11—11. The auxiliary framework supported by the main beams 16—16 includes in addition to the upper set of transversely extending members 18, a lower set of similar transversely extending members 19 from which are supported the lower set of conveyor tracks 10—10, the outer extremities of the transversely extending members 18 and 19 being suitably joined together and braced in any desired manner, for example, as shown in Figure 1 wherein such side bracing members are designated by the reference numerals 20 and 21.

As appears most clearly in Figures 1 and 2, the lower pair of stationary tracks 10—10 extend from the point 22 at the loading station A to the point 23 at the unloading station B, and similarly, the upper pair of stationary tracks 11—11 terminate at the point 24 at the loading station and at the point 25 at the unloading station. The elevating mechanism 12 at the loading station A includes a pair of laterally spaced tracks 26—26 which are adapted to be brought into registry with the proximate ends of the lower set of tracks 10—10 or of the upper set of tracks 11—11, while the elevating mechanism at the unloading station B similarly includes a pair of laterally spaced tracks 27—27 which are adapted to be brought into registry with the proximate ends of the lower set of tracks 10—10 or of the upper set of tracks 11—11. The orbit of travel of the carriages through and about the conveyor system is indicated by the arrows in Figure 1, from which it will be apparent that as a carriage 14 is loaded at the loading station A, it moves along the lower conveyor tracks 10 to the unloading station B where the stock is removed from the carriage. At this stage in the cycle of operation the elevating mechanism 13 at the unloading station is, of course, in its lowermost position so that the carriage supporting tracks 27—27 are each in longitudinal alignment with the lower stationary tracks 10—10 of the conveyor system. When the carriage has been unloaded at the unloading station, it is raised by means of the elevating mechanism 13 to a height sufficient to present its supporting tracks 27—27 in alignment with the upper set of stationary tracks 11—11 of the conveyor system. These upper tracks are so inclined with respect to the horizontal that when the unloaded carriage is shifted from its supporting tracks 27—27 on to the tracks 11—11, it moves by gravity along these tracks toward the loading end thereof, the unloaded carriage being then transferred from the tracks 11—11 to the tracks 26—26 of the elevating mechanism 12 at the loading station, said mechanism having been elevated, of course, to present the carriage receiving tracks 26—26 thereof in registry with the upper set of stationary tracks 11—11. Thereupon the unloaded carriage, while supported upon the tracks 26—26 of the elevating mechanism 12, is lowered by the latter mechanism so as to enable the unloaded carriage to be shifted on to the lower set of tracks 10—10. Suitable stop mechanisms are, of course, provided at all necessary points in the conveyor system to insure against accidental displacement of the carriage from the tracks, and such safety stop devices together with the means for operating the elevating mechanisms and for shifting the carriages from the vertically movable tracks to the stationary tracks of the system will be described in detail hereinafter.

Referring now to Figures 3 to 6, inclusive, it will be observed that the several movable carriages 14 for supporting the stock delivered from the take-off apparatus 15 are each generally of the construction shown and described in the aforesaid Letters Patent No. 2,102,453, these carriages each comprising a pair of laterally spaced, longitudinally extending side frame members 28—28 suitably connected together to provide a rigid frame of rectangular outline adapted for disposition in a substantially horizontal plane. Secured to each of the opposite side members of this horizontally disposed frame are a pair of vertical suspension members 29—29, the upper ends of which are each provided with a suitable journalled trolley wheel 30, the opposed pairs of trolley wheels being laterally so spaced apart as to adapt them to ride along the tracks of the conveyor system.

Each of the carriages 14 is provided at opposite sides thereof with endless sprocket chains 31—31, which are relatively so arranged that they are adapted to travel in substantially vertically disposed planes spaced apart a distance slightly greater than the width of the stock delivered from the take-off apparatus. Each of these sprocket chains 31—31 is provided with a plurality of spaced, externally projecting dogs or pins 32, the spacing between these pins being such as to accommodate between each successive pair of the pins one of the bars 33, which is projected from the stock take-off apparatus in the manner and by the means described in said prior Letters Patent No. 2,102,453.

The sprocket chains 31—31 of each carriage are synchronized in operation by the intermeshed gears 35 and 35ª arranged at either side of the carriage, the chains being further arranged so that their upper sections travel substantially along a horizontal plane disposed slightly above the bottom of the stack of bars 33 contained within the magazine 34 of the stock take-off apparatus.

It will be understood that when one of the carriages 14 is positioned at the loading station A, the stock take-off apparatus 15 operates to successively project on to the synchronized sprocket chains 31 of the carriage the bars 33 with the result that the stock is disposed upon the carriage in the festooned condition shown most clearly in Figure 3. Inasmuch as the mechanism for effecting this festooning of the stock upon the conveyor forms no part of the present invention and is fully described in the aforesaid prior Patent No. 2,102,453, no further description of said festooning operation or of the means for effecting the same need be given herein.

In order to steady the carriage 14 in relation to the stock take-off apparatus during the operation of loading the carriage and to insure against unintentional shifting of the carriage along the tracks of the conveyor system, an interlocking mechanism designated generally by the reference numeral 36 (see Figure 3) is employed between the stock take-off apparatus 15 and the carriage being loaded. This interlocking mechanism is shown most clearly in Figure 7 and comprises a pair of laterally spaced arms 37—37 which are respectively keyed to the opposite ends of a transversely extending shaft 38 suitably journalled upon the skeleton frame of the stock take-off apparatus. One of these arms 37 is provided with a rearwardly operating extension or arm 39 by means of which the shaft 38 may be oscillated to raise or lower the arms 37—37. The outer extremities of these arms 37—37 are each notched as at 40, these notches being respectively adapted to receive the oppositely projecting extensions of the forward shaft 41 of the festooning carriage 14 when the arms 37 are swung into the position shown most clearly in Figures 3 and 7. In this interlocking position of the arms 37—37, it will be observed that the movable carriage 14 is maintained in relatively fixed position with respect to the stock take-off apparatus and is restrained against any movement along the conveyor tracks. This interlocking mechanism is substantially like that shown and described in the prior patent aforesaid and includes as part thereof the means for supporting the idler weight roll 42, which coacts with each of the successively projected bars 33 to clampingly engage and retain the stock against movement during the formation of each looped section of the festooned stock.

When a given carriage receives its full load of festooned stock, it is ready to be moved or shifted from the loading station A along the tracks 10—10 of the conveyor system in the direction of the arrow of Figure 1. This lower level of tracks 10—10 is disposed in a horizontal plane and the loaded carriages are shifted longitudinally thereof by the means now to be described. As appears most clearly in Figures 1, 2, 8 and 9, this means is pneumatically operated and includes a double acting air cylinder 43 having a longitudinally extending piston rod 44 which is fitted at its outer extremity with a wheeled carriage 45. This wheeled carriage 45 rides within a suitable fixed guide 46 therefor providing upper and lower guide surfaces 47 and 48 between which are confined the rollers 49 of the wheeled carriage, these rollers being longitudinally spaced apart. Pivoted upon the shaft 50 of the rearmost rollers is a freely depending dog 51 having the right angular branches 52 and 53, as shown most clearly in Figure 8. The forward edge of the branch 52 of the dog is rounded as shown to provide a camming surface. It will be understood that the dog 51 is adapted to swing in a vertical plane disposed substantially midway between the lower level of tracks 10—10 and is generally so arranged that when it is in the full lined position shown in Figure 8, the freely extending extremity of the dog is adapted to engage the outer end of the carriage frame so as to propel the carriage in the direction indicated by the arrow in Figure 8. To prevent lateral displacement of the dog out of its normal vertical plane of movement, the lower member of the fixed guide 46 for the wheeled carriage which supports the dog, is provided with a longitudinally extending opening therein, the side walls of which serve to confine and guide the dog 51 during its longitudinal movement.

In operation, when it is desired to propel a loaded carriage out of its loading station and along the conveyor tracks 10—10, air under pressure is supplied to the cylinder 43 to cause the piston rod 44 to be extended sufficiently for the dog 51 to engage the far side of the frame member 54 of the carriage. As appears most clearly in Figures 3 to 6, inclusive, this member 54, which is engaged by the dog 51 of the carriage shifting mechanism, forms part of the upper frame structure of the carriage and lies in a horizontal plane spaced above the upper plane of the carriage sprocket chains 31. The frame members 54—54 extend between and interconnect the vertically extending suspension 29 of the carriage and are themselves interconnected by a transversely extending bracing member 55.

During the extension of the piston rod 44 under the influence of its operating air cylinder 43, the dog 51 will necessarily ride over the top of the carriage and along the top surface of the bracing member 55, and in so doing the dog will be cammed into the dotted line position shown in Figure 8. When the piston rod 44 is fully extended, the dog 51 will have cleared the far side of the load supporting carriage and will then of its own weight drop into the full line position shown in Figure 8. Thereupon, by supplying air to the other side of the double acting air cylinder 43, the piston rod 44 will be retracted with the result that the dog 51 engages the member 54 of the carriage and draws the latter out of its loading position to an extent sufficient to clear the station for reception of another carriage to be loaded. As clearly appears in Figure 8, the branch 53 of the pivoted dog 51 so engages the lower surface of the wheeled carriage 45 as to restrain the dog 51 from rotating in counter-clockwise direction beyond the full line position shown.

As the loading of each carriage is completed, it is shifted laterally of the loading station by the means and in the manner just described, this shifting movement of the last carriage to be loaded being transmitted from carriage to carriage with the result that corresponding movement is imparted to all of the carriages on the lower level tracks 10—10 of the conveyor system. Thus, the several loaded conveyors are progressively shifted from the loading station A toward the unloading station and as said carriages successively arrive at the latter station, each is there unloaded of its festooned stock, such unloading being effected by slitting each looped section of the festooned stock longitudinally of their respective bight extremities so as to leave suspended upon each of the bars 33 a doubled section of the stock. Each of these doubled sections of stock is then readily removed from the carriage by the simple expedient of lifting each bar 33, together with the section of stock suspended therefrom, from the carriage, these bars being then removed from the unloaded sections of stock for return to the take-off apparatus where they are restacked in the bar magazine 34.

As each of the carriages 14 is unloaded, it is raised by means of the elevating mechanism 13 (see Figure 1) to the elevation of the upper level of inclined tracks 11—11 for return thereon to the loading station of the conveyor system, the carriages being there lowered to the level of the lower tracks 10—10 by the lowering mechanism 12. This mechanism for lowering the empty carriage is shown most clearly in Figures 12, 13 and 19, wherein it will be observed that it includes the laterally spaced vertically movable track sections 26—26 which are adapted respectively to be brought into registry alternately with the lower set of tracks 10—10 and the upper set of tracks 11—11.

The movable track sections 26—26 are each supported by a pair of vertically extending rack members 56—56 respectively arranged adjacent either end of each track section 26. Thus, the lowering mechanism 13 includes four of such rack members 56. The upper portions of each of these rack members is in meshed engagement with a pinion gear 57 which is keyed to a shaft 58 extending transversely of the tracks and journalled at opposite ends thereof in journal brackets 59—59 fixed to the upper main supporting beams 16—16 of the conveyor. Suitably journalled upon each bracket 59 are guide rollers 60, 61 and 62 for each of the vertically movable rack members 56, these rollers serving in conjunction with the pinion gear 57 to maintain the rack member in vertical position during its up and down movement. As clearly appears in the drawings, each pair of the guide rollers 60—60, 61—61 and 62—62 is provided with a common shaft extending transversely between the opposed pairs of journal brackets 59—59.

Keyed upon each of the pinion gear shafts 58 is a second pinion gear 63, these latter pinion gears being each disposed adjacent the same ends of the shafts 58 and being commonly engaged by a horizontally extending rack member 64. This horizontal rack member 64 is backed by a pair of guide rollers 65—65 respectively fitted on a pair of transverse shafts 66—66 extending transversely between opposed pairs of the journal brackets 59—59. The arrangement is such that as the horizontal rack bar 64 is shifted in the direction indicated by the arrow in Figure 19, the two pinion gears 63—63 will be rotated commonly in clockwise direction and thus will impart corresponding rotation, through the shafts 58—58, to all four of the pinion gears 57. These latter gears, being in mesh respectively with the several vertical rack bars, will impart a vertical movement thereto so as to raise the tracks 26—26 supported thereby from a lowered position (see Figures 12 and 19) where they are in registry with the lower tracks 10—10 to an elevated position where they are in registry with the upper tracks 11—11.

Conversely, when the horizontal rack bar 64 is shifted in reverse direction, the tracks 26—26 will be lowered from their uppermost position into the full line position shown in Figures 12 and 19. In order to effect this shifting of the horizontal rack bar in one direction or the other, a double acting air cylinder 67 is employed (see Figure 2), the piston rod of which is suitably connected to the rack bar 64 in longitudinal continuation thereof. Any suitable means may be employed for controlling the operation of this air cylinder 67 and the supply of operating fluid thereto.

The elevating mechanism 13 at the unloading station of the conveyor system is substantially similar to the lowering mechanism just described in so far as concerns its general construction and operation. This elevating mechanism is shown in more or less detail in Figures 15 and 16 wherein it will be observed that the vertically movable track sections 27—27 are supported by four vertically extending rack bars 68, which are respectively secured adjacent the outer extremities of the track sections 27—27. As in the case of the lowering mechanism 12, the vertical rack bars 68 of the elevating mechanism are guided during their vertical movement by the guide rolls 69, 70 and 71, carried on transversely extending shafts suitably mounted in the journal brackets 72 and carried by the main supporting beams 16—16 of the conveyor system. The vertical rack bars 68 are each in engagement with pinion gears 73 which are keyed upon the transversely extending shafts 74, these latter shafts extending between and being journalled in opposed pairs of the brackets 72. Each of the shafts 74 has keyed thereto a second pinion gear 75, these pinion gears 75 commonly engaged by the horizontally extending rack bar 76. As in the case of the lowering mechanism, the rack bar 76 of the elevating mechanism is backed and guided by the guide rolls 77, and the rack bar is suitably connected to and extends in longitudinal continuation of a piston rod of a double acting air cylinder 78 (see Figures 1 and 2). This air cylinder is similar in construction and operation to that employed for operating the lowering mechanism 12 at the loading station of the conveyor system.

It will be apparent that as the horizontal rack bar 76 is shifted in one direction or another under the impulse of the double acting air cylinder, it will impart rotation to the pinion gears 75 and 74 to thereby cause the vertical rack bars 68 to move upwardly or downwardly as the case may be. Thus, this elevating mechanism is operative at the will of the operator to alternately present the track sections 27 in longitudinal registry with the lower set of tracks 10—10 and the upper set of tracks 11—11.

It will be observed at this point that the track sections 27—27 of the elevating mechanism are disposed in a substantially horizontal plane so as to facilitate the transfer thereto of a loaded conveyor from the fixed lower set of conveyor tracks 10—10. Obviously, this transfer of a carriage 14 from the tracks 10—10 on to the tracks 27—27 of the elevating mechanism would be effected only when the latter are in their lowermost position and in longitudinal registry with the tracks 10—10. Upon unloading the carriage, the elevating mechanism is operated in the manner and by the means just described to raise the tracks 27—27 to present them in registry with the upper set of stationary conveyor tracks 11—11. The empty carriage supported by the tracks 27—27 is then in position to be shifted on to the tracks 11—11 so as to effect its return to the loading station. Due to the inclination of the tracks 11—11, the carriage moves along them by its own weight and under the influence of gravity. Because of the horizontal disposition of the track sections 27—27, some means is necessary for propelling the empty carriage from these track sections on to the inclined tracks 11—11, this means being preferably in the form of an air cylinder 79, which is so mounted to the rear of the uppermost position assumed by the raised empty carriage that upon operation thereof the piston 80 thereof is projected against the carriage to shift it off the tracks 27—27 and on to the inclined tracks 11—11. This air cylinder pusher mechanism for the carriage is shown most clearly in Figures 1, 2, 17 and 18, wherein it will be observed that the piston 80 thereof is of sufficient length to insure shifting of the carriage entirely free and clear of the tracks 27—27 of the elevating mechanism.

Having so shifted the carriage from the tracks 27—27 on to the tracks 11—11, the piston 80 of the pusher mechanism is retracted and the air cylinder 78 is operated to lower the tracks 27—27 into registry with the lower set of tracks 10—10 for reception of the next succeeding carriage 14 in the line.

It will further be understood that as a carriage moves along the upper set of inclined tracks 11—11 toward the loading station, the elevating mechanism 12 at such station will be so operated as to present its track sections 26—26 thereof in longitudinal registry with said tracks 11—11 so as to permit the carriage to be transferred from the tracks 11—11 to the track sections 26—26 of the mechanism 12. This transference will normally be effected by gravity and when the empty carriage is positioned upon the tracks 26—26, the latter will be lowered in the manner and by the means hereinbefore described to present them in registry with the lower set of tracks 10—10. The empty carriage so supported by the lowered track sections 26—26 will be in advance of the loading station A (see Figures 1 and 2) and when said loading station is free to accommodate the empty carriage, the carriage supported by the lowered tracks 26—26 will be manually shifted on to the tracks 10—10 to locate it in loading position. It is at this point that the interlocking mechanism hereinbefore described and shown more particularly in Figure 7, will be operated to lock the carriage fixedly in position with respect to the stock take-off apparatus 15.

It will be noted that when the movable track sections 26—26 and 27—27 are in their lowermost positions as shown in Figure 1, the upper tracks of the conveyor system are necessarily interrupted by open spaces in the length thereof. Conversely, when these movable track sections 26—26 and 27—27 are shifted into their uppermost positions, such open spaces appear in the lower tracks of the conveyor system. In order to insure against accidental shifting or movement of any carriage off of the main tracks 10—10 or 11—11 into one of the open spaces just referred to, suitable stop mechanisms are provided which operate automatically to restrain the carriages against movement along either track until such time when the complemental track sections are in registry therewith. These stop mechanisms are shown in Figures 20 to 29, inclusive, the points of their application being as shown more particularly in Figures 12 and 15.

Referring first to the stop mechanism of Figures 20 and 21, one of which is employed at each of the unloading ends of the lower set of tracks 10—10 to prevent a carriage from proceeding beyond said ends unless the track sections 27—27 are in registry therewith as shown in Figure 15, it will be observed that such mechanism includes a vertically disposed detent 81 which is adapted to move freely in a bracket 82 fixed to one of the tracks 10. This bracket 82 is provided with a bearing lug 83 in which is journalled one end of a transversely extending shaft 84, the opposite end of this shaft being correspondingly journalled in a similar bearing lug formed on a bracket fixed to the opposite track 10. Keyed to the shaft are a pair of operating levers 85 (one only being shown), each of these levers having oppositely extending arms 86—87. The arm 86 of each lever engages each detent 81 in such manner that upon depressing the arm 87 the detent is raised into the position shown in Figure 15. When the activating force for depressing the arm 87 is released, the detent falls of its own weight into the position shown in Figure 21.

The lever arm 87 extends beyond the free end of the track 10 into a position wherein it is engageable by a lug 88 fixed to the proximate end of the movable track 27. Thus, the arrangement is such that when the tracks 27—27 are in their lowermost position (see Figure 15) the levers 85 are actuated to raise the detents 81 to a height sufficient to permit the wheels of the carriage to pass freely therebeneath and on to the tracks 27—27. However, when the tracks 27—27 are in their elevated position, the detents fall of their own weight into position (see Figure 21) wherein they intercept the movement of the carriage wheels along the tracks 10—10 and so prevent the carriage from entering into the space vacated by the raised track sections 27—27.

The stop mechanism shown in Figures 22 and 23 is mounted upon one of the tracks 27—27 at the carriage discharge end thereof, as shown in Figure 15, it being observed that this mechanism includes a lever 89 pivoted to the track, as at 90, with the arm 91 thereof loosely engaging a detent 92. This latter detent is vertically disposed and is guided in its movement in an extension 93 of the pivot bracket. The opposite arm 94 of the lever 89 is freely disposed and is adapted to be engaged by the lower end of a trip member 95 which is suitably secured at the top of the conveyor as shown in Figure 15. The lower extremity of the detent is beveled, as at 96, to permit it to be cammed upwardly as it is engaged by the wheel of the carriage as the latter moves from the tracks 10—10 onto the tracks 27—27. When the carriage has passed freely upon the tracks 27—27, the detent 92 drops of its own weight and so prevents backward movement of the carriage off of said tracks. A fixed stop 97 on one or both of the track sections 27—27 (see Figure 15) operates in conjunction with the detent 92 to maintain the carriage against displacement from said track section in either direction as the same are raised to their elevated position.

When the track sections 27—27 reach their uppermost position, the trip member 95 engages the free arm 94 of the lever 89 and depresses it to such extent that the detent 92 is raised sufficiently to permit the carriage to move freely from the track sections onto the inclined tracks 11—11.

The stop mechanism shown in Figures 24 and 25 is mounted at the lower extremity of one of the inclined upper tracks 11—11, this mechanism being employed for the purpose of precluding continued movement of the conveyor beyond the lower extremities of said inclined tracks when the track sections 26—26 are in their lowered position. This stop mechanism includes a vertically disposed detent 98 which is adapted to intercept the movement of the carriage along the tracks 11—11 by engaging one of the forward wheels of the carriage just before the latter reaches the end of the tracks 11—11. This detent 98 is guided in its vertical movement by the horizontal extension 99 of a pivot bracket 100, this bracket being secured in any suitable manner to one of the tracks 11. The detent 98 normally drops of its own weight into the intercepting position shown in Figures 12 and 25. Pivoted to the bracket 100, as at 101, is a lever 102 for raising the detent 98 automatically when the track sections 26—26 are presented in registry with the main inclined tracks 11—11. This lever 102 extends loosely through the detent 98 with its free end so disposed as to be engaged by a laterally projecting lug 103 suitably secured to one of the movable track sections 26 (see Figure 12). It will be apparent that when the track sections 26—26 are elevated for registry with the main upper tracks 11—11, this lug 103 will engage the lever 102 to thereby lift the detent 98 out of carriage intercepting position. As the track sections 26—26 are lowered, the detent 98 immediately falls of its own weight into intercepting position. If desired, a pair of the stop mechanisms shown in Figures 24 and 25 may be employed to provide each track 11—11 with a detent, and in such case, a common pivot shaft 103 may be provided for commonly actuating both of the operating levers 102. By non-rotatively securing the pivoted ends of these levers to the operating shaft 103$^a$, actuation of one lever will impart corresponding actuation to the other and consequently, only one operating lug 103 need be employed.

The stop mechanisms shown in Figures 26 and 27 is employed at the loading station extremities of the lower set of tracks 10—10, it being preferred to employ one of these stop mechanisms on each of the tracks 10—10. This stop mechanism includes a vertically disposed detent 104 which is guided in its vertical movement by a pivot bracket 105 suitably fixed to one side of each track 10. Pivoted upon this bracket 105 is a lever 106, one arm 107 of which loosely engages the detent 104, while the other arm 108 thereof extends freely beyond the end of the track 10. Preferably, the levers 106 are keyed to a transversely extending shaft so that actuation of one lever results in corresponding actuation of the other. When the movable tracks 26—26 are in an elevated position out of registry with the tracks 10—10, the detents 104 will of their own weight assume the position shown in Figure 27. However, when the movable tracks 26—26 are in position of registry with the tracks 10—10, the lug 103 provided on one or the other of both of the movable tracks engages the arm 108 of the lever to oscillate the same into the position shown in Figure 12 and so cause the detent 104 to be raised into a position permitting free movement of the carriage from the tracks 26—26 onto the tracks 10—10.

The stop mechanism shown in Figures 28 and 29 is mounted upon one of the tracks 26—26 as shown by the dotted lines of Figure 12, the purpose of this stop mechanism being to prevent accidental displacement of the carriage from the tracks 26—26 during their movement between the upper and lower levels of the main tracks, such stop mechanism operating in conjunction with a fixed stop 110 provided at the opposite extremity of one or both of the movable tracks 26. It will be observed that the stop mechanism of Figures 28 and 29 includes, as in all of the other stop mechanisms, a vertically disposed detent 111, the lower extremity of which is beveled as at 112 to permit it to be cammed upwardly by the carriage wheel passing therebeneath during transit from the tracks 11—11 onto the track sections 26—26. Normally, the detent 111 assumes by its own weight a lowered position in which it intercepts movement of the carriage off of the tracks 26—26. When the track sections 26—26 are lowered into position of registry with the tracks 10—10, the detent 111 is automatically raised to permit free movement of the carriage wheels therebeneath through engagement of the pivoted actuating lever 113 with a trip member 114 fixed to and carried by the fixed track 11. Thus, when the tracks 26—26 are in registry with the tracks 10—10, the detent 111 is lifted to permit the carriage to pass freely from the tracks 26—26 to the tracks 10—10. However, at all times when these tracks are not in such registry, the detent 111 assumes a lowered position to prevent displacement from the tracks 26—26 of any carriage supported thereon.

In order to limit the upward movement of the movable tracks of both elevating mechanisms, fixed abutments are provided as at 115 and 116 (see Figures 12, 15 and 19) upon the stationary tracks, while corresponding abutments 117 and 118 are provided upon the lower stationary tracks to limit the downward movement of the movable track sections.

In order to guide the elevating mechanisms 12 and 13 during vertical movement thereof and prevent any tendency for the same to sway, suitable roller guides are provided at each outer end of the mechanisms centrally between the opposite sides thereof. One of these guides is shown most clearly in Figure 14, such guide comprising a main vertically extending beam section 119, which is securely fixed to the lower cross member 120 of the elevating mechanism frame (see also Figures 13, 16 and 19). This beam section 119 is fitted at its outer end with a pair of laterally spaced roller members 121—121 which are respectively operatively associated with and ride along vertically extending guide members 122—122 which are fixed in any suitable manner to the stationary framework of the conveyor system. These guides serve to prevent any tendency for the elevating mechanisms to skew with respect to their vertical axes of movement as well as with respect to the longitudinal center line of the conveyor system as a whole. Also, they serve effectively to insure registry of the movable track sections with the upper and lower sets of stationary tracks.

Obviously, the invention is subject to various changes and modifications without departing from the general principles or real spirit of the invention. Thus, in lieu of the air cylinder means described for operating the elevating mechanisms and for shifting the carriages from the vertically movable track sections to the stationary tracks of the system, other means may be employed. Also, the stop mechanisms may be varied, while the operation of the interlocking mechanism employed between the take-off apparatus and the carriage being loaded may be so timed and related to the mechanism for initially propelling the loaded carriage on to the tracks 10—10 that the latter mechanism may not be operated until after the interlocking mechanism has been released from its operative position shown in Figures 3 and 7. Accordingly, it is intended in the appended claims to define the invention broadly as well as specifically.

What is claimed as new and useful is:

1. In a conveying system for handling rubber stock and the like delivered to carriages upon which the stock is suspended in festooned form, in combination, a main lower track for the carriages extending from a carriage-loading station to a distant carriage-unloading station, said track being disposed in elevated position above the floor for supporting a plurality of carriages suspended therefrom, said track being further characterized in that it is entirely free of obstructions downwardly from the horizontal plane thereof for a space sufficient to freely accommodate the carriages suspended from the track and the stock suspended from the carriages, a second upper track spaced vertically above said main track and adapted to support a plurality of carriages suspended therefrom, the space between said upper and lower tracks being also free of obstructions against free passage of carriages suspended from said upper track, an overhead framework from which said upper and lower tracks are suspended, uprights supporting said framework, and auxiliary track sections operatively disposed at either end of said system and adapted, respectively, to be vertically shifted into longitudinal alinement with the proximate ends of either of the lower or upper tracks, said auxiliary track sections being each characterized in that it is also free of obstructions in the space immediately beneath the horizontal plane thereof whereby to provide a free and unobstructed path for the longitudinal movement of a carriage from one to the other of a pair of longitudinally alined fixed and movable tracks.

2. In a conveying system for handling rubber stock and the like delivered to carriages upon which the stock is suspended in festooned form, in combination, a lower level fixed set of main tracks extending between distantly separated loading and unloading stations for the stock, an upper level fixed set of main tracks also extending between said stations and arranged in vertically spaced relation with respect to said lower level tracks, a set of vertically movable tracks located at each of said stations and adapted to be selectively positioned in longitudinal continuation of either the lower level or upper level set of tracks, means for vertically shifting said movable tracks into registry with the proximate end of either set of main tracks, and means for so supporting all of said tracks in operative relation as to provide free and unobstructed paths for the longitudinal movement of carriages suspended from said tracks, said last named means comprising an overhead framework from which said upper and lower tracks are suspended and uprights supporting said frame-work.

3. In a conveying system for handling rubber stock and the like delivered to carriages upon which the stock is suspended in festooned form, in combination, a lower level fixed trackway extending from a loading station to a remotely located unloading station, an upper level fixed trackway spaced vertically above said lower level trackway and also extending between said loading and unloading stations, an overhead framework from which said upper and lower tracks are suspended, uprights supporting said framework, vertically movable auxiliary trackways disposed at opposite ends of said vertically spaced trackways and adapted each to be presented in longitudinal alinement with one or the other of said trackways, all of said fixed and movable trackways being so operatively related as to provide for free and unobstructed paths for longitudinal movement of the carriages suspended therefrom, and means for shifting a carriage suspended from one of said movable trackways on to and along a fixed trackway with which said movable trackway is in registry.

4. In a conveying system for handling rubber stock and the like delivered to carriages upon which the stock is suspended in festooned form, in combination, a lower level fixed trackway extending from a loading station to a remotely located unloading station, an upper level fixed trackway spaced vertically above said lower level trackway and also extending between said loading and unloading stations, an overhead framework from which said upper and lower tracks are suspended, uprights supporting said framework, vertically movable auxiliary trackways disposed at opposite ends of said vertically spaced trackways and adapted each to be presented in longitudinal alinement with one or the other of said trackways, all of said fixed and movable trackways being so operatively related as to provide for free and unobstructed paths for longitudinal movement of carriages suspended therefrom, and mechanically operated means for shifting each loaded carriage from the lowered auxiliary trackway at the loading station end of the system on to the lower level fixed trackway for engagement with a previously loaded carriage suspended from said lower level trackway, said last-mentioned means being thus operative upon each actuation thereof to shift all of the loaded carriages suspended from said lower level trackway ahead to the extent of one carriage, the foremost carriage in the line thereof being thereby transferred, by operation of said mechanically operated shifting means, on to the lowered auxiliary trackway at the unloading station end of the system.

FREDERICK LEOPOLD.